US011885911B2

United States Patent
Che et al.

(10) Patent No.: US 11,885,911 B2
(45) Date of Patent: Jan. 30, 2024

(54) APPARATUS AND METHOD FOR EFFICIENT SCANNER TRAJECTORY RECONSTRUCTION FROM MOBILE LIDAR POINT CLOUD

(71) Applicant: Oregon State University, Corvallis, OR (US)

(72) Inventors: Erzhuo Che, Corvallis, OR (US); Michael Olsen, Corvallis, OR (US)

(73) Assignee: OREGON STATE UNIVERSITY, Corvallis, OR (US)

( * ) Notice: Subject to any disclaimer, the term of this patent is extended or adjusted under 35 U.S.C. 154(b) by 642 days.

(21) Appl. No.: 16/943,987

(22) Filed: Jul. 30, 2020

(65) Prior Publication Data

US 2021/0048512 A1  Feb. 18, 2021

Related U.S. Application Data (60) Provisional application No. 62/888,419, filed on Aug. 16, 2019.

(51) Int. Cl.
| | |
|---|---|
| G01S 17/89 | (2020.01) |
| G01S 7/481 | (2006.01) |
| G01S 7/48 | (2006.01) |
| G01S 7/4861 | (2020.01) |

(52) U.S. Cl.
CPC .......... *G01S 7/4808* (2013.01); *G01S 7/4817* (2013.01); *G01S 7/4861* (2013.01); *G01S 17/89* (2013.01)

(58) Field of Classification Search
CPC ....... G01S 7/4808; G01S 7/4817; G01S 7/483
See application file for complete search history.

(56) References Cited

PUBLICATIONS

Zheng Fang, Shibo Zhao, Shiguang Wen, Yu Zhang, "A Real-Time 3D Perception and Reconstruction System Based on a 2D Laser Scanner", Journal of Sensors, vol. 2018, Article ID 2937694, 14 pages, 2018. (Year: 2018).*
M. Bosse and R. Zlot, "Continuous 3D Scan-Matching with a Spinning 2D Laser," in 2009 IEEE International Conference on Robotics and Automation, 4312-4319, May 2009. (Year: 2009).*
A. Harrison and P. Newman, "High Quality 3D Laser Ranging Under General Vehicle Motion," in 2008 IEEE International Conference on Robotics and Automation, 7-12, May 2008. (Year: 2008).*
A. Harchowdhury, L. Kleeman and L. Vachhani, "Coordinated Nodding of a Two-Dimensional Lidar for Dense Three-Dimensional Range Measurements," in IEEE Robotics and Automation Letters, vol. 3, No. 4, pp. 4108-4115, Oct. 2018. (Year: 2018).*
Che, E. et al., "Object recognition, segmentation, and classification of mobile laser scanning point clouds: A state of the art review", Sensors 2019, 19(4), 810; https://doi.org/10.3390/s19040810.

* cited by examiner

*Primary Examiner* — Yuqing Xiao
*Assistant Examiner* — Zhengqing Qi
(74) *Attorney, Agent, or Firm* — MUGHAL GAUDRY & FRANKLIN PC (57) ABSTRACT

An efficient approach to reconstruct the scanner trajectory of the mobile LIDAR system from the point cloud with minimal user parameters. The process of reconstructing trajectory comprises four steps: (1) spin rate estimation, (2) scan plane estimation, (3) scan origin estimation, and (4) global smoothing.

20 Claims, 6 Drawing Sheets

APPARATUS AND METHOD FOR EFFICIENT SCANNER TRAJECTORY RECONSTRUCTION FROM MOBILE LIDAR POINT CLOUD

CLAIM OF PRIORITY

This application claims the benefit of priority of U.S. Provisional Patent Application No. 62/888,419, filed on Aug. 16, 2019, and titled "APPARATUS AND METHOD FOR EFFICIENT SCANNER TAJECTORY RECONSTRUCTION FROM MOBILE LIDAR POINT CLOUD," which is incorporated by reference in its entirety.

GOVERNMENT SUPPORT STATEMENT

The embodiments of the invention were made with the support of the Oregon Department of Transportation (ODOT) under Grant/Contract number 30530-17-01, and with the support of the National Science Foundation (NSF) under Grant/Contract number CMMI1351487. The Government has certain rights in the invention.

BACKGROUND

Mobile Laser Scanning (MLS, or mobile LIDAR) is an accurate and efficient approach to acquire detailed, 3-D data, based on Light Detection and Ranging (LIDAR) technology from a mobile platform, typically a vehicle. In addition to the laser scanner, one or multiple Global Positioning System (GPS)/Global Navigation Satellite System (GNSS) receivers and an Inertial Measurement Unit (IMU) are also integrated on a mobile LIDAR system, to measure the position and state (orientation) of the moving platform, such that the point cloud can be directly geo-referenced.

Typically, the trajectory data records the position and state of the IMU with a time stamp during the data collection based on the combination (e.g., Kalman filtering) of data from the IMU and other sensors, such as the GNSS and DMI (Distance Measuring Instrument). For each scan point, the corresponding origin and orientation of the scanner can be interpolated from the trajectory based on the time stamps associated with the calibration information, such that the scan points can be geo-referenced.

The trajectory data is often considered as a secondary dataset, and is not provided with the mobile LIDAR point cloud. Nevertheless, many advanced processing methods for mobile LIDAR data take advantage of the trajectory information, which is not readily available.

BRIEF DESCRIPTION OF DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION OF EXEMPLARY EMBODIMENTS

Based on the information provided by the trajectory data, there are three main goals that can be achieved when processing mobile LIDAR data: data partitioning, ground extraction, and radiometric calibration. Although many approaches utilize the trajectory for mobile LIDAR data processing and analysis, in a lot of cases, the trajectory data is ignored as an intermediate product, or lost during data transfer and archiving, because they are usually stored in a separate file. Note, that in many of these studies, the IMU trajectory, rather than the scanner trajectory, is likely utilized, which can lead to additional errors in the subsequent geometric computations, since the IMU and scanner cannot be physically co-located.

To overcome the challenges mentioned above, some embodiments provide an efficient approach to reconstruct the scanner trajectory of the mobile LIDAR system from the point cloud with minimal user parameters. Here, the scanner trajectory refers to a position (e.g., in Cartesian coordinates) and state (orientation) of the scanner. With the given angular resolution of the scanner, which can be found in the specification of the mobile LIDAR system, spin rate of the scanner is estimated. Thereafter, the scan plane is estimated to obtain the orientation of the scanner. The position of the scanner is then estimated using least square adjustment. As such, trajectory of the mobile LIDAR system is reconstructed with minimal input. The approach to reconstruct the scanner trajectory can be used in point cloud data processing, analysis, and visualization. The approach can also be used in 3D mapping, autonomous driving, robotics, etc.

Many point cloud data formats (e.g., as defined by the ASPRS LAS Specification 1.4, revision 14, revision date 26 Mar. 2019) record time stamps for each scan point. Here, ASPRS LAS refers to a LAS file by American Society for Photogrammetry & Remote Sensing. The LAS file is intended to contain LIDAR (or other) point cloud data records. The data is generally put into this format from software (e.g., provided by hardware vendors), which combines GPS, IMU, and laser pulse range data to produce X, Y, and Z point data. The data format of the LAS file provides an open format that allows different hardware and software tools to output data in a common format.

In addition, the angular resolution and spin rate of the scanner can be assumed constant during the data collection. Thus, point cloud data with time stamps provide both the geometric and time constraints to enable reverse engineering to reliably reconstruct the trajectory. Some embodiments use merely one parameter, the scan (angular) resolution $d\theta$, which represents the nominal angular increment (stepping interval) between the scanner observations to reconstruct trajectory. In some embodiments, the process of reconstructing trajectory comprises four steps: (1) spin rate estimation, (2) scan plane estimation, (3) scan origin estimation, and (4) global smoothing.

The embodiments of the disclosure will be understood more fully from the detailed description given below and from the accompanying drawings of various embodiments of the disclosure, which, however, should not be taken to limit the disclosure to the specific embodiments, but are for explanation and understanding only.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices.

The term "module" or "logic" may refer to one or more passive and/or active components that are arranged to cooperate with one another to provide a desired function.

The term "signal" may refer to at least one current signal, voltage signal, magnetic signal, or data/clock signal.

The meaning of "a," "an," and "the" include plural references. The meaning of "in" includes "in" and "on."

The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

Figure 1:
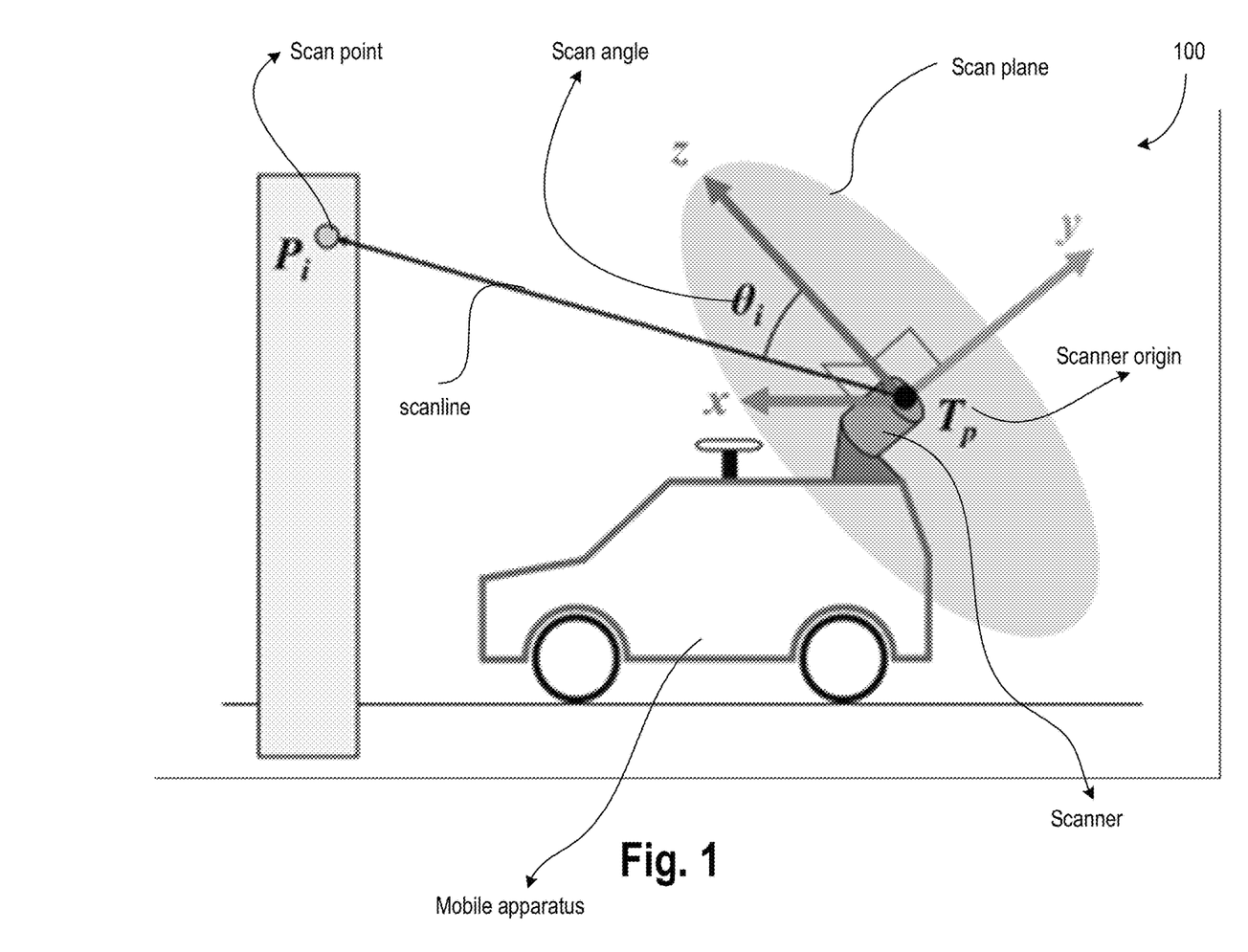
FIG. 1 illustrates a scan coordinate system, in accordance with some embodiments of the disclosure.

FIG. 1 illustrates a scan coordinate system 100, in accordance with some embodiments of the disclosure. System 100 illustrates a LIDAR system on a vehicle (e.g., a mobile apparatus or device). FIG. 1 shows the definition of scan coordinate system and scan angle, where $T_p$ is the origin of the scanner for the scan point $P_i$ with its scan angle $\theta_i$, and the x-axis is horizontal. In some embodiments, the process of reconstructing trajectory comprises four steps: (1) spin rate estimation, (2) scan plane estimation, (3) scan origin estimation, and (4) global smoothing.

Spin rate estimation: To partition the data into scanlines, the spin rate is estimated first. Based on the assumption of a constant angular resolution (dθ) between pulses, the time between each two adjacent laser beams should be constant. However, in cases where there is no return for a laser beam, nothing is recorded in an unorganized data format for that pulse to indicate that no data was acquired. Thus, all of the points are sorted by increasing time, and the time difference between each pair of adjacent points is computed. The shortest time difference is then utilized as the initial estimate of the time interval for each observation corresponding to dθ. Because there is some uncertainty in the time differences, all of the time differences are averaged within a factor of, for example 1.5, of the minimum time interval to obtain the refined time resolution, dt. In other embodiments, other factors may be used (e.g., between 1.2 to 1.9). The spin speed ω and spin rate f of the scanner is calculated by Equation (1), where the units for dθ, dt, f and ω are radians, seconds, Hz, and rad/s, respectively.

$$\omega = 2\pi f = \frac{d\theta}{dt} \tag{1}$$

Using the spin rate, the time stamp of each point is used to partition the point cloud data into scanlines. Note that generally both dθ (or number of measurements per rotation) and ω (or f) are reported in the specification of the mobile LIDAR system. However, various embodiments merely use dθ as an input parameter, while ω is derived from dθ because the angle measurement unit is usually more precise and reliable than the spin unit in a scanner.

Scan plane estimation: Although the mobile LIDAR system continually moves during data acquisition, the time for collecting one scanline, dt, is usually short, and is often synched with the IMU rate, which typically ranges between 100 Hz to 2,000 Hz for a mobile LIDAR system. Hence, the point cloud within each scanline can be assumed to lie approximately within a plane centered at the scanner origin along the trajectory. Since the previous step has partitioned the data into scanlines, the scan plane is estimated using sample points in each scanline to compute the orientation (normal vector) of the scan plane, through Principal Component Analysis (PCA), to ensure robustness to errors. Next, each point is projected onto its associated scan plane to obtain its local 2-D coordinates in the coordinate system defined in FIG. 1.

The scan plane is first defined as the x-z plane, hence the normal vector to the scan plane is the y-axis. Nevertheless, defining the arbitrary x-axis and z-axis requires the IMU measurements and corresponding calibration information with the offsets between the scanner and IMU. Fortunately, the roll angle of a vehicle driven on the road is usually small, while the pitch and heading are calculated through the scan plane estimation. Therefore, by forcing both the y-axis and z-axis to point upward, the x-axis is defined as a horizontal vector perpendicular to the y and z axes to form a right-handed coordinate system. Additionally, the scan angle θ of a scan point is defined as the counter-clockwise angle from the z-axis to the laser beam.

Scan origin estimation: With the estimated scan plane and the scan coordinate system defined in the previous step, the 3-D coordinates of the scan points are transformed to local, 2-D coordinates, with the centroid of all points (average coordinates) within each scanline serving as an initial origin. Here, an approach is described for computing the local coordinates of the scan origin $T_p$ in each scan plane, which can then be utilized as a geo-referenced trajectory point for further computations. Further refinement of $T_p$ is achieved through a least square adjustment process. Although it may be difficult to set constraints using the spatial relationships such as range and scan angle between the scan points and the trajectory point because the scan origin is unknown, the difference in the scan angles $\Delta\theta$ between any two scan points can be easily computed by using the time difference $\Delta t$ and the spin speed $\omega$, as shown in Equation (2).

$$\Delta\theta = \omega \times \Delta t \qquad (2)$$

Geometric relationships are then used between scan points in the line to set up the necessary least squares constraint equations to inversely solve for the scan origin coordinates.

Figure 2:
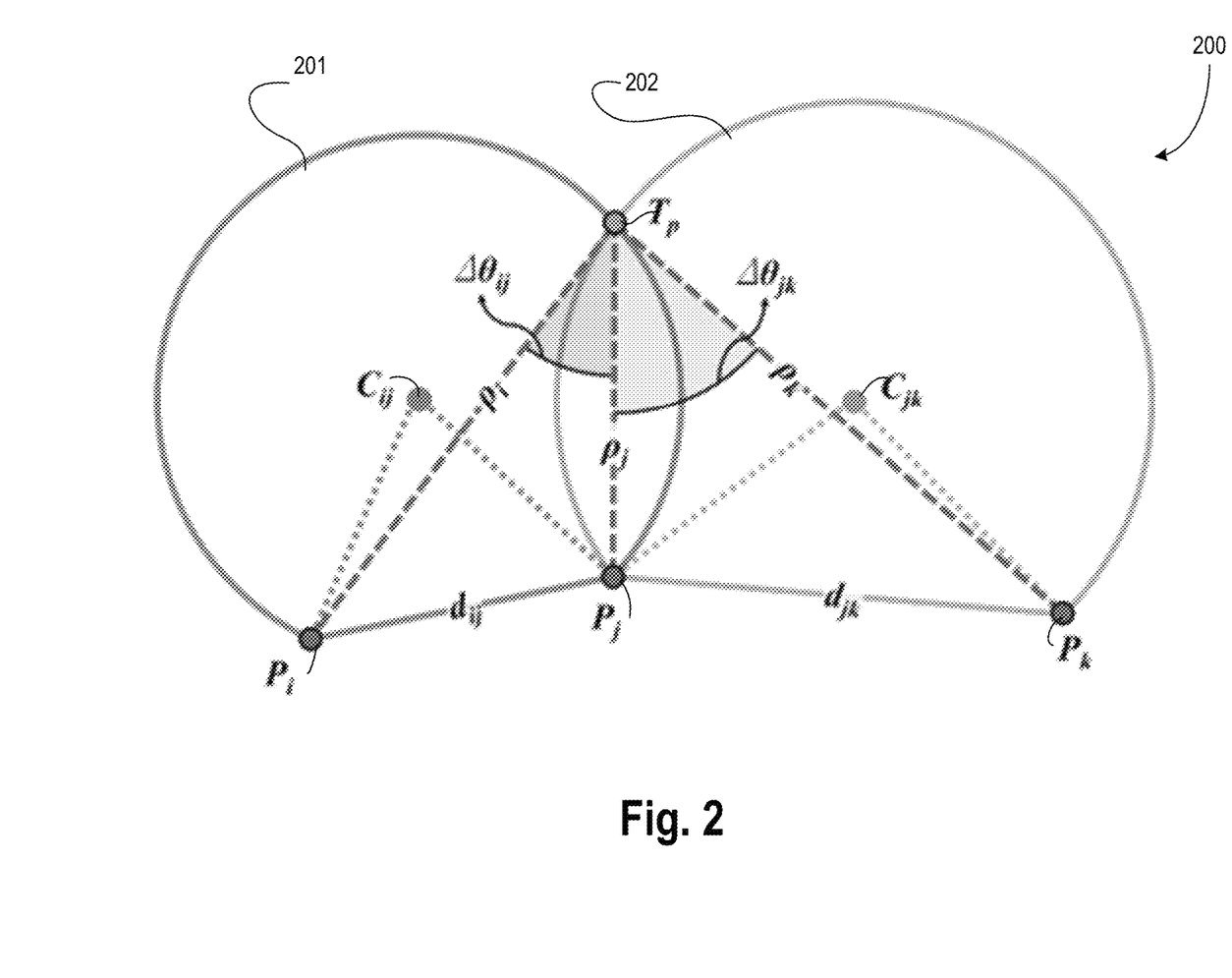
FIG. 2 illustrates a geometrical graph for initial estimation of the scan origin, in accordance with some embodiments.

FIG. 2 illustrates a geometrical graph 200 or initial estimation of the scan origin, in accordance with some embodiments. The underlying principle is that an inscribed angle is constant on an arc between two known points. Then, based on the locations of any two scan points with a scan angle difference of $\Delta\theta$ in the scanline, the trace of all the possible locations of the scanner origin will lie on an arc as illustrated by FIG. 2. Geometrical graph 200 shows initial estimation of the scan origin where $P_i$, $P_j$, and Pk are three scan points with the differences in scan angles $\Delta\theta_{ij}$ and $\Delta\theta_{jk}$. Arc 201 and arc 202 with $C_{ij}$ and $C_{jk}$ as centers, respectively, are formed from the corresponding scan points; $T_p$ represents the estimated scan origin of the scan points in this scanline.

Another arc can be formed with another pair of scan points with the corresponding scan angle difference. The intersection of these two arcs provides an initial estimation of the scan origin. To simplify the estimation of the scan origin in this stage, merely three scan points are used such that one point is shared between the two arcs, each formed with one of the other two points. This selection ensures that merely one intersection point is available as a scan origin, because the other intersection is the scan point lying on both arcs (e.g., $P_j$ in graph 200). Note that to improve the spacing between scan points and avoid sharp angles from points spaced too closely, which may lead to large errors in estimating the position of the scan origin, the points from a scanline are partitioned evenly into three groups based on the total point count in each scanline, and then the first point is selected from each group for the calculations. Additionally, because the arcs with their corresponding centers can be on either side of the scan points, the approach of some embodiments may initially have two solutions. In some embodiments, a least squares adjustment is performed with one iteration and the solution is selected with a smaller variance using a constraint model.

Once the initial position of the scan origin is solved using 3 points (e.g., 2 pairs) in the scanline, a constraint for more point pairs is formulated considering all points in the scanline, using an equation. This equation is derived using the cosine law that incorporates the ranges $\rho_i$ and $\rho_j$ of both points, distance between them $d_{ij}$, and the difference in scan angles $\Delta\theta_{ij}$ as shown in Equation (3).

$$\rho_i^2 + \rho_j^2 - 2\rho_i\rho_j \cos \Delta\theta_{ij} = d_{ij}^2 \qquad (3)$$

Although the ranges $\rho_i$ and $\rho_j$ are some of the original raw measurements used to compute the coordinates of the points i and j, this information is generally not stored with the point cloud, and is determined inversely. Hence, in Eq. 3, the computed ranges are dependent on the coordinates of the scan origin, which is refined in each iteration of the least squares adjustment.

For the aforementioned reasons of avoiding sharp angles, scan point pairs are selected with a constant interval of point counts. Additionally, to ensure the robustness of the computation, any point pairs with a scan angle difference larger than 180° (or substantially 180°) from the adjustment is eliminated. Thus, the number of points (pairs) used for solving the scan origin are a function of the angular distribution and point count in a partition consisting of a scanline. Then, by linearizing the model, a least squares adjustment can be conducted with every pair of points selected as one observation. In each iteration, both the residuals and variance of the observations are computed and any observations with a squared residual larger than three times that of the variance for the next iteration is removed.

After the least squares adjustment converges or reaches a maximum number of iterations, the coordinates of the scan origin on the scan plane for all the scanlines are accurately estimated. Because this scan origin is in a local coordinate system, the geo-referenced coordinates of this origin point (which also serves as a trajectory point) can be generated by applying the inverse transformation matrix of the scan.

The global smoothing refinement approach applies a weighted moving average process to both the position and state of each trajectory point. For example, assuming that the trajectory is linear and the speed is constant in a short period, the position of a trajectory point can be estimated by computing the average between its two neighbors. Such estimated position can then be averaged with the current trajectory reconstruction as illustrated by equation 4.

$$P'_i = w_{P_i} P_i + (1 - w_{P_i}) \frac{P_{i+k} + P_{i-k}}{2} \qquad (4)$$

where $P_i$ and $P'_i$ represent the initial and refined position of a trajectory point, respectively, while $P_{i+k}$ and $P_{i-k}$ represent the neighbors of this point with an index offset of k. The weight $w_{P_i}$ for refining the position of the trajectory point is computed based on the assumption that the reliability of the trajectory reconstruction decreases with the increasing distance between a trajectory point and its neighbors (Eq. 5).

$$w_{P_i} = \frac{D_{P_{i-k}P_{i+k}}}{2 \times \min(D_{P_{i-k}P_i}, D_{P_iP_{i+k}}) + D_{P_{i-k}P_{i+k}}} \qquad (5)$$

where $D_{P_{i-k}P_i}$ and $D_{P_iP_{i+k}}$ represents the distance between a trajectory point and its neighbors while $D_{P_{i-k}P_{i+k}}$ represents the distance between two neighbors of the trajectory point. A similar computation is performed in terms of the state of the trajectory point as well where the 3D vector is used instead of the 3D coordinates for position, and the dot product of two vectors is used as the distance between the states of two trajectory points. Such refinement is performed in both directions (e.g., start-to-end and end-to-start) and the average is taken as the result in one iteration.

The trajectory estimation scheme of various embodiments can be used to estimate the trajectory of the Unmanned Aircraft System (UAS) LIDAR system, Airborne LIDAR system, and other LIDAR systems configured on a moving platform (e.g., handheld, backpack). In one example, the trajectory estimation scheme of various embodiments can be used in a software that can convert the point cloud without the trajectory to a format that records such information in case the trajectory file is missing. In another example, the trajectory estimation scheme of various embodiments can be used as either a standalone or built-in function that reconstructs scanner trajectory, which can be used as a pre-processing step such that the following processing with the algorithms require the trajectory to function. In yet another example, the trajectory estimation scheme of various embodiments can be used as a built-in function that displays the trajectory of the point cloud collection on a map, which avoids the high computation load to visualize all the point clouds. The trajectory estimation scheme of various embodiments can be used for generating high-definition (HD) maps for autonomous driving, survey of land, earth mapping by satellite, etc.

Figure 3:
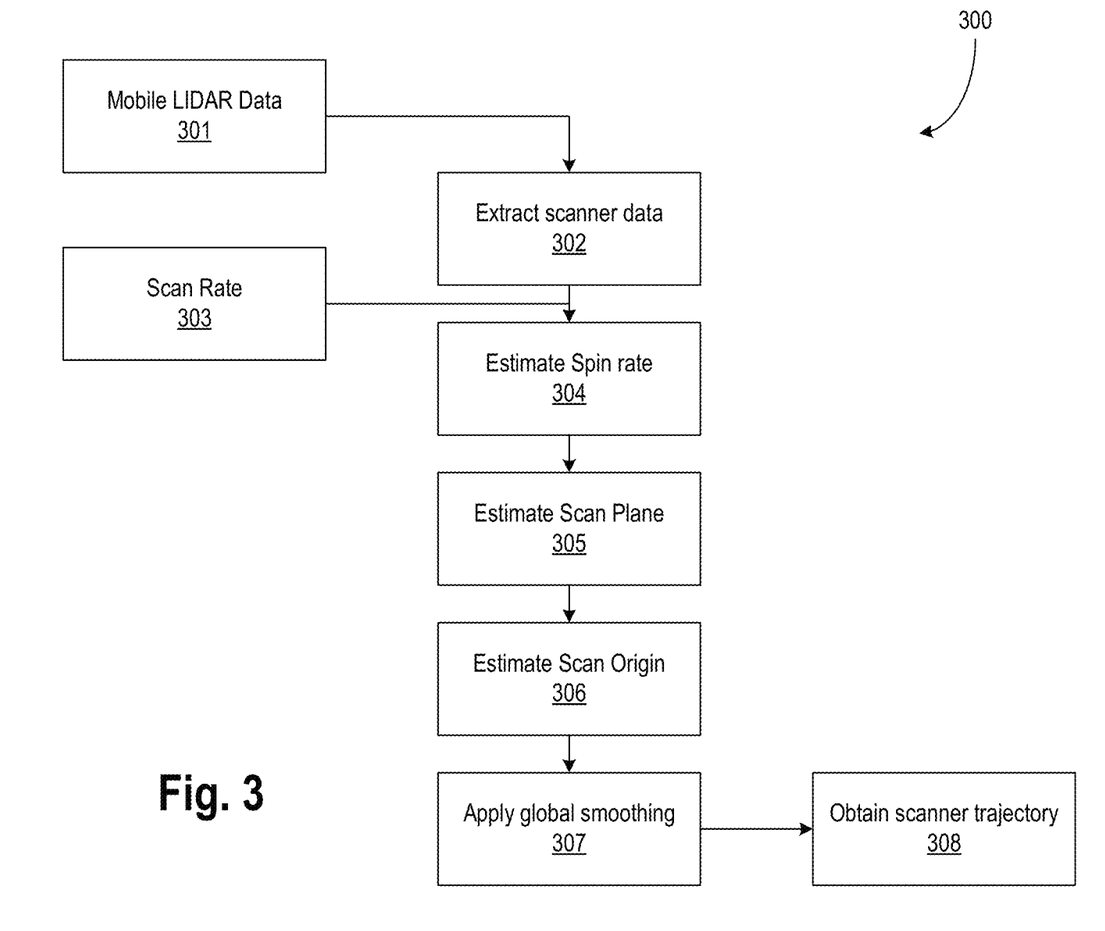
FIG. 3 illustrates a flowchart of a method of reconstructing trajectory, in accordance with some embodiments.

FIG. 3 illustrates flowchart 300 of a method of reconstructing trajectory, in accordance with some embodiments. While various blocks are shown in a particular order, the order can be modified. For example, some blocks can be performed before others, while some blocks can be performed simultaneously or in parallel.

Blocks 301, 302, and 303 are input data which include mobile LIDAR data, scanner data, and scan rate, respectively. These input data are used by block 304 to estimate spin rate. Block 302 extracts all the data points acquired by the same sensor in one scan. These data points are extracted from the mobile LIDAR data with the coordinates and time stamps recorded. The scan rate can be obtained from the specifications of the mobile LIDAR system used for data acquisition. The spin rate of the scanner is calculated using equation 1. Equation 1 uses angular resolution (dθ) between pulses to estimate the spin rate. As discussed herein, both dθ (or number of measurements per rotation) and spin rate ω (or f) are reported in the specification of the mobile LIDAR system. However, various embodiments merely use dθ as an input parameter to estimate the spin rate, while ω is derived from dθ because the angle measurement unit is usually more precise and reliable than the spin unit in a scanner. Using the spin rate, the time stamp of each scan point $P_i$ can be used to partition the point cloud data into scanlines.

At block 305, scan plane is estimated. As discussed with reference to block 304, data is portioned into scanlines. The scan plane is estimated using sample points in each scanline to compute the orientation (e.g., normal vector) of the scan plane. One way to compute the orientation is to use Principal Component Analysis. Each scan point is then projected on to its associated scan plan to obtain its local 2D coordinates (e.g., x-z coordinates). The scan plane is first defined as the x-z plane, hence the normal vector to the scan plane is the y-axis. With y-axis and z-axis pointing upward, the x-axis is defined as a horizontal vector perpendicular to the y and z axes to form a right-handed coordinate system as shown in in FIG. 1. Additionally, the scan angle θ of a scan point is defined as the counter-clockwise angle from the z-axis to the laser beam.

Figure 4:
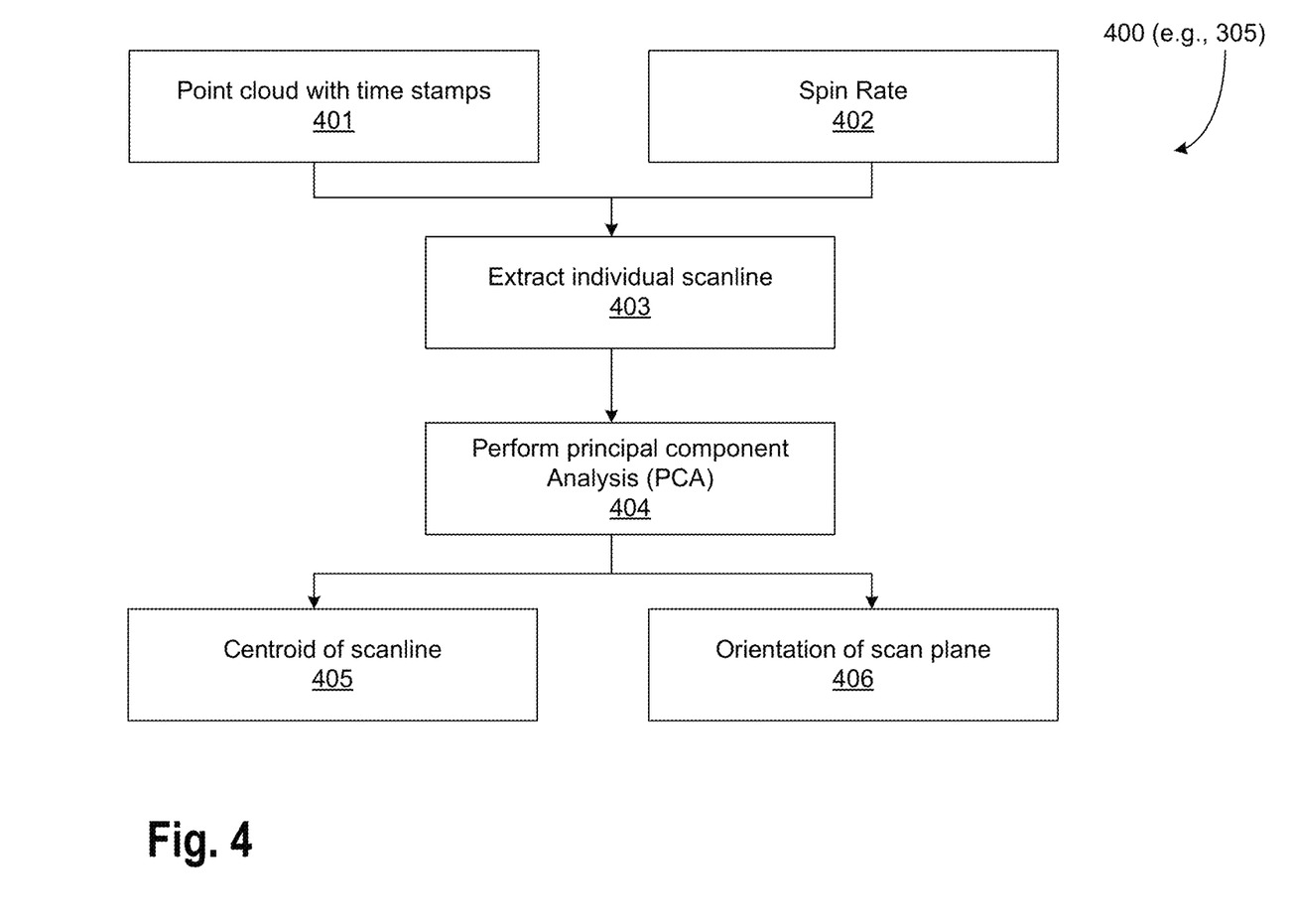
FIG. 4 illustrates a flowchart of a method of estimating scan plane, in accordance with some embodiments.

FIG. 4 illustrates flowchart 400 (e.g., 305) of a method of estimating scan plane, in accordance with some embodiments. While various blocks are shown in a particular order, the order can be modified. For example, some blocks can be performed before others, while some blocks can be performed simultaneously or in parallel. To estimate the scan plane, point cloud with time stamps 401 and spin rate 402 are used by block 403 to extract individual scanline(s) 403. Thereafter, at block 404, the scan plane is estimated using sample points in each scanline to compute the orientation (normal vector) of the scan plane, through Principal Component Analysis (PCA), to ensure robustness to errors. As such, centroid of scanline 405 and orientation of scan plane 406 are achieved.

Referring back to FIG. 3, at block 306, scan origin is estimated. The 3-D coordinates of the scan points are transformed to local, 2-D coordinates, with the centroid of all points (average coordinates) within each scanline serving as an initial origin. Using equation (2) the difference in the scan angles Δθ between any two scan points can be computed by using the time difference Δt and the spin speed ω. Geometric relationships are then used between scan points in the line to set up the necessary least squares constraint equations to inversely solve for the scan origin coordinates. The underlying principle is that an inscribed angle is constant on an arc between two known points. Then, based on the locations of any two scan points with a scan angle difference of Δθ in the scanline, the trace of all the possible locations of the scanner origin will lie on an arc as described with reference to FIG. 2.

Figure 5:
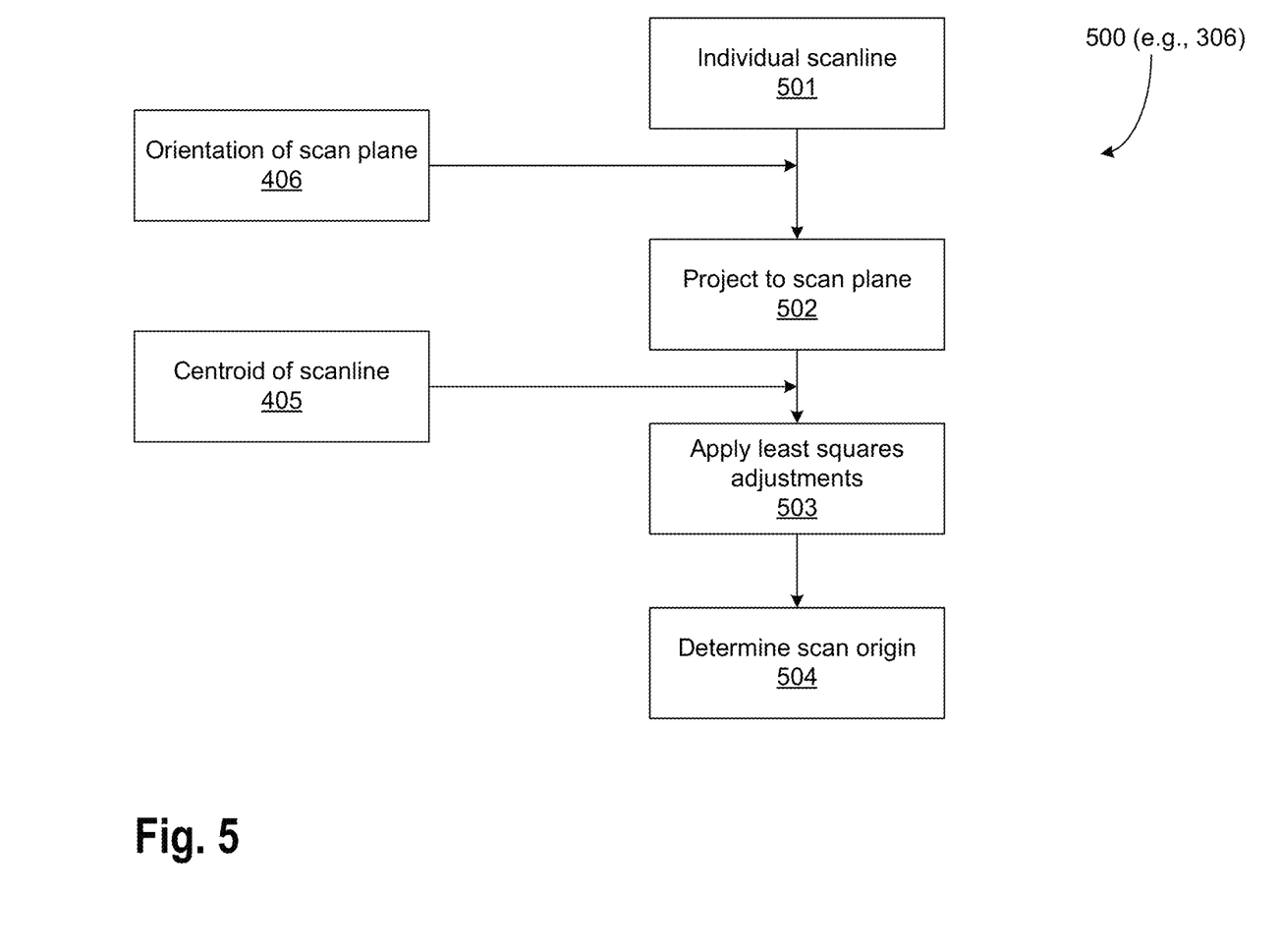
FIG. 5 illustrates a flowchart of a method of estimating scan origin, in accordance with some embodiments.

FIG. 5 illustrates flowchart 500 (e.g., block 306) of a method of estimating scan origin, in accordance with some embodiments. While various blocks are shown in a particular order, the order can be modified. For example, some blocks can be performed before others, while some blocks can be performed simultaneously or in parallel. To estimate the scan origin, centroid of scanline 405 and individual scanline (e.g., extracted by block 403) are used to estimate the scan origin. At block 501, individual scan line and long with orientation of the scan plane 406 are projected to the scan plane as indicated by block 502. At block 503, least squares adjustment is applied iteratively to estimate and refine the coordinates of the scan origin on the scan plane for all scanline to accurately determine the scan origin as indicated by block 504.

Referring back to FIG. 3, at block 307, global smoothing is applied. The global smoothing refinement approach applies a weighted moving average process to both the position and state of each trajectory point. For example, assuming that the trajectory is linear and the speed is constant in a short period, the position of a trajectory point can be estimated by computing the average between its two neighbors. The output of the global smoothing refinement approach is the scanner trajectory obtained at block 308.

Figure 6:
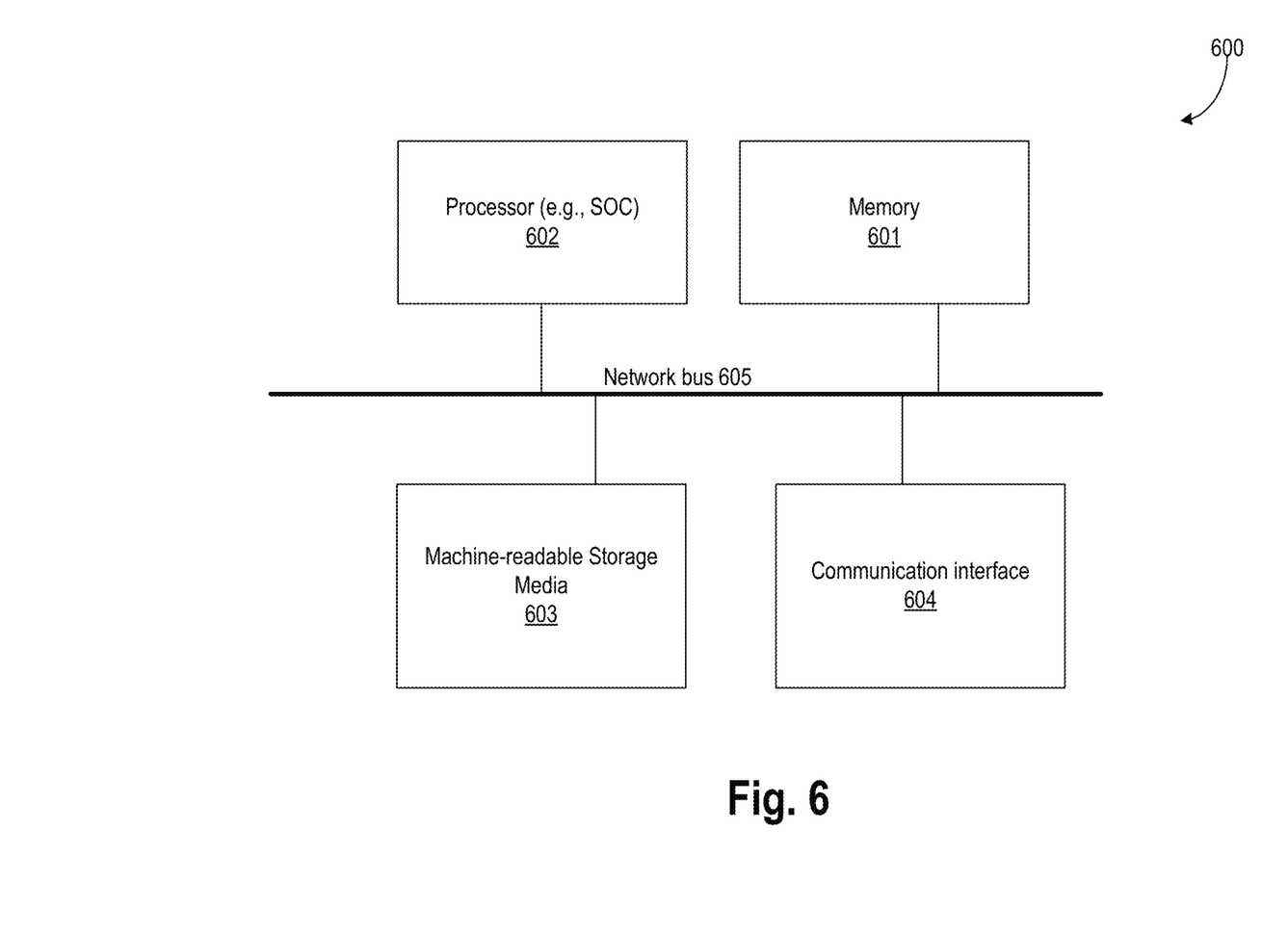
FIG. 6 illustrates a computer system with machine-readable instructions for reconstructing trajectory, in accordance with some embodiments.

FIG. 6 illustrates a computer system 600 with machine-readable instructions for reconstructing trajectory, in accordance with some embodiments. Elements of embodiments (e.g., FIGS. 3-5 and other embodiments) are also provided as a machine-readable medium (e.g., memory) for storing the computer-executable instructions (e.g., instructions to implement any other processes discussed herein). In some embodiments, computing platform comprises memory 601, processor 602, machine-readable storage media 603 (also referred to as tangible machine-readable medium), communication interface 604 (e.g., wireless or wired interface), and network bus 605 coupled together.

In some embodiments, processor 602 is a Digital Signal Processor (DSP), an Application Specific Integrated Circuit (ASIC), a general-purpose Central Processing Unit (CPU), or a low power logic implementing a simple finite state machine to perform the method of flowcharts of FIGS. 3-5 and/or various embodiments, etc.

In some embodiments, the various logic blocks of system are coupled together via network bus 605. Any suitable protocol may be used to implement network bus 605. In some embodiments, machine-readable storage medium 603 includes instructions (also referred to as the program software code/instructions) for calculating or measuring distance and relative orientation of a device with reference to another device as described with reference to various embodiments and flowchart.

Program software code/instructions associated with flowcharts of FIGS. 3-5 (and/or various embodiments) and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with flowcharts of FIGS. 3-5 (and/or various embodiments) are executed by the computer system.

In some embodiments, the program software code/instructions associated with flowcharts of FIGS. 3-5 (and/or various embodiments) are stored in a computer executable storage medium and executed by the processor. Here, computer executable storage medium is a tangible machine-readable medium that can be used to store program software code/instructions and data that, when executed by a computing device, causes one or more processors to perform a method(s) as may be recited in one or more accompanying claims directed to the disclosed subject matter.

The tangible machine-readable medium may include storage of the executable software program code/instructions and data in various tangible locations, including for example ROM, volatile RAM, non-volatile memory and/or cache, and/or other tangible memory as referenced in the present application. Portions of this program software code/instructions and/or data may be stored in any one of these storage and memory devices. Further, the program software code/instructions can be obtained from other storage, including, e.g., through centralized servers or peer-to-peer networks and the like, including the Internet. Different portions of the software program code/instructions and data can be obtained at different times and in different communication sessions or in the same communication session.

The software program code/instructions (associated with flowcharts of FIGS. 3-5 and other embodiments) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine-readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine-readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry® Droid®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

In some embodiments, machine-readable storage media 603 includes instructions stored thereon, that when executed, cause one or more processors 602 to perform a method comprising: extracting scanner data associated with a mobile Light Detection and Ranging system, wherein the scanner data includes angular resolution between pulses from the mobile Light Detection and Ranging system; estimating spin rate using the angular resolution between the pulses; estimating a scan plane using the estimated spin rate to obtain orientation of a scanner of the mobile Light Detection and Ranging system; estimating a scan origin using the estimated scan plane; and performing global smoothing of the estimated scan origin to reconstruct trajectory.

In some embodiments, the machine-readable storage media 603 include further instructions stored thereon, that when executed, cause the one or more processors 602 to perform the method comprising partitioning the scanner data into scanlines using the spin rate. In some embodiments, estimating a scan plane comprises computing normal vector of the scan plane using scan points between the scanlines; and projecting each scan point of the scan points to their associated scan planes to obtain a corresponding 2-D coordinate. In some embodiments, computing the normal vector comprises applying Principal Component Analysis. In some embodiments, estimating the scan origin comprises determining centroids of each scan point within each scan line to determine an initial scan origin, which is an average of centroids of all the scan points. In some embodiments, the centroid of each scan point corresponds to a trajectory point, wherein performing global smoothing of the estimated scan origin comprises applying a weighted moving average process to a position and orientation or state of each trajectory point.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims. Where specific details are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Various embodiments described herein are illustrated as examples. The features of these examples can be combined with one another in any suitable way. These examples include:

Example 1: A machine-readable storage media having instructions stored thereon, that when executed, cause one or more processors to perform a method comprising: extracting scanner data associated with a mobile Light Detection and Ranging system, wherein the scanner data includes angular resolution between pulses from the mobile Light Detection and Ranging system; estimating spin rate using the angular resolution between the pulses; estimating a scan plane using the estimated spin rate to obtain orientation of a scanner of the mobile Light Detection and Ranging system; estimating a scan origin using the estimated scan plane; and performing global smoothing of the estimated scan origin to reconstruct trajectory.

Example 2: The machine-readable storage media of example 1, having instructions stored thereon, that when executed, cause one or more processors to perform the method comprising: partitioning the scanner data into scanlines using the spin rate.

Example 3: The machine-readable storage media of example 2, wherein estimating a scan plane comprises: computing normal vector of the scan plane using scan points between the scanlines; and projecting each scan point of the scan points to their associated scan planes to obtain a corresponding 2-D coordinate.

Example 4: The machine-readable storage media of example 3, wherein computing the normal vector comprises applying Principal Component Analysis.

Example 5: The machine-readable storage media of example 3, wherein estimating the scan origin comprises determining centroids of each scan point within each scan line to determine an initial scan origin, which is an average of centroids of all the scan points.

Example 6: The machine-readable storage media of example 5, wherein the centroid of each scan point corresponds to a trajectory point, wherein performing global smoothing of the estimated scan origin comprises applying a weighted moving average process to a position and orientation or state of each trajectory point.

Example 7: A method for reconstructing a scanner trajectory from a mobile Light Detection and Ranging system, the method comprising: extracting scanner data associated with the mobile Light Detection and Ranging system, wherein the scanner data includes angular resolution between pulses from the mobile Light Detection and Ranging system; estimating spin rate using the angular resolution between the pulses; estimating a scan plane using the estimated spin rate to obtain orientation of a scanner of the mobile Light Detection and Ranging system; estimating a scan origin using the estimated scan plane; and performing global smoothing of the estimated scan origin to reconstruct trajectory.

Example 8: The method of example 7 comprising partitioning the scanner data into scanlines using the spin rate.

Example 9: The method of example 8, wherein estimating a scan plane comprises computing normal vector of the scan plane using scan points between the scanlines.

Example 10: The method of example 9 wherein estimating a scan plane comprises projecting each scan point of the scan points to their associated scan planes to obtain a corresponding 2-D coordinate.

Example 11: The method of example 10, wherein computing the normal vector comprises applying Principal Component Analysis.

Example 12: The method of example 11, wherein estimating the scan origin comprises determining centroids of each scan point within each scan line to determine an initial scan origin, which is an average of centroids of all the scan points.

Example 13: The method of example 12, wherein the centroid of each scan point corresponds to a trajectory point.

Example 14: The method of example 13, wherein performing global smoothing of the estimated scan origin comprises applying a weighted moving average process to a position and orientation or state of each trajectory point.

Example 15: An apparatus to reconstruct a scanner trajectory from a mobile Light Detection and Ranging system, the apparatus comprising: a memory; a processor coupled to the memory; and a communication interface coupled to the processor, wherein the processor is configured to: extract scanner data associated with a mobile Light Detection and Ranging system, wherein the scanner data includes angular resolution between pulses from the mobile Light Detection and Ranging system; estimate spin rate using the angular resolution between the pulses; estimate a scan plane using the estimated spin rate to obtain orientation of a scanner of the mobile Light Detection and Ranging system; estimate a scan origin using the estimated scan plane; and perform global smoothing of the estimated scan origin to reconstruct trajectory.

Example 16: The apparatus of example 15, wherein the processor is configured to partition the scanner data into scanlines using the spin rate.

Example 17: The apparatus of example 16, wherein to estimate a scan plane, the processor is configured to: compute normal vector of the scan plane using scan points between the scanlines; and project each scan point, from among the scan points, to their associated scan planes to obtain a corresponding 2-D coordinate.

Example 18: The apparatus of example 17, wherein to compute the normal vector, the processor is configured to apply Principal Component Analysis.

Example 19: The apparatus of example 18, wherein to estimate the scan origin, the processor is configured to determine centroids of each scan point within each scan line to determine an initial scan origin, which is an average of centroids of all the scan points.

Example 20: The apparatus of example 19, wherein the centroid of each scan point corresponds to a trajectory point, wherein to perform global smoothing of the estimated scan origin, the processor is configured to apply a weighted moving average process to a position and orientation or state of each trajectory point.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A method for reconstructing a trajectory of a scanner of a mobile Light Detection and Ranging system, the method comprising:
    communicating with the mobile Light Detection and Ranging system;
    downloading, based on the communicating, data of a file format for interchange and archiving of point cloud data to extract scanner data, wherein the point cloud data is associated with the mobile Light Detection and Ranging system;
    extracting the scanner data associated with the mobile Light Detection and Ranging system, wherein the scanner data includes angular resolution between pulses from the mobile Light Detection and Ranging system;
    estimating spin rate by a first application of the angular resolution between the pulses;
    estimating a scan plane by a second application of the estimated spin rate to obtain orientation of the scanner of the mobile Light Detection and Ranging system;
    estimating a scan origin using the estimated scan plane; and
    performing global smoothing of the estimated scan origin to reconstruct the trajectory of the scanner.

2. The method of claim 1 comprising partitioning the scanner data into scanlines using the spin rate.

3. The method of claim 2, wherein estimating the scan plane comprises computing normal vector of the scan plane using scan points between the scanlines.

4. The method of claim 3 wherein estimating the scan plane comprises projecting each scan point of the scan points to their associated scan planes to obtain a corresponding 2-D coordinate.

5. The method of claim 4, wherein computing the normal vector comprises applying Principal Component Analysis.

6. The method of claim 5, wherein estimating the scan origin comprises determining centroids of each scan point within each scan line to determine an initial scan origin, which is an average of centroids of all the scan points.

7. The method of claim 6, wherein a centroid of the centroids of each scan point corresponds to a trajectory point.

8. The method of claim 7, wherein performing global smoothing of the estimated scan origin comprises applying a weighted moving average process to a position and an orientation or state of each trajectory point.

9. A non-transitory machine-readable storage media having instructions stored thereon, that when executed, cause one or more processors to perform a method to reconstruct a trajectory of a scanner of a mobile Light Detection and Ranging system, the method comprising:
    communicating with the mobile Light Detection and Ranging system;
    downloading, based on the communicating, data of a file format for interchange and archiving of point cloud data to extract scanner data, wherein the point cloud data is associated with the mobile Light Detection and Ranging system;
    extracting the scanner data associated with the mobile Light Detection and Ranging system, wherein the scanner data includes angular resolution between pulses from the mobile Light Detection and Ranging system;
    estimating spin rate by a first application of the angular resolution between the pulses;
    estimating a scan plane by a second application of the estimated spin rate to obtain orientation of the scanner of the mobile Light Detection and Ranging system;
    estimating a scan origin using the estimated scan plane; and
    performing global smoothing of the estimated scan origin to reconstruct the trajectory of the scanner.

10. The non-transitory machine-readable storage media of claim 9, having further instructions stored thereon, that when executed, cause the one or more processors to perform a further method comprising:
    partitioning the scanner data into scanlines using the spin rate.

11. The non-transitory machine-readable storage media of claim 10, wherein estimating a scan plane comprises:
    computing normal vector of the scan plane using scan points between the scanlines; and
    projecting each scan point of the scan points to their associated scan planes to obtain a corresponding 2-D coordinate.

12. The non-transitory machine-readable storage media of claim 11, wherein computing the normal vector comprises applying Principal Component Analysis.

13. The non-transitory machine-readable storage media of claim 11, wherein estimating the scan origin comprises determining centroids of each scan point within each scan line to determine an initial scan origin, which is an average of centroids of all the scan points.

14. The non-transitory machine-readable storage media of claim 13, wherein a centroid of the centroids of each scan point corresponds to a trajectory point, and wherein performing the global smoothing of the estimated scan origin comprises applying a weighted moving average process to a position and an orientation or state of each trajectory point.

15. An apparatus to reconstruct a trajectory of a scanner from a mobile Light Detection and Ranging system, the apparatus comprising:
    a memory;
    a processor coupled to the memory; and
    a communication interface coupled to the processor, wherein the processor is to:
        communicate with the mobile Light Detection and Ranging system;
        download, based on the communicating, data of a file format for interchange and archiving of point cloud data to extract scanner data, wherein the point cloud data is associated with the mobile Light Detection and Ranging system;

extract the scanner data associated with the mobile Light Detection and Ranging system, wherein the scanner data includes angular resolution between pulses from the mobile Light Detection and Ranging system;

estimate spin rate by a first application of the angular resolution between the pulses;

estimate a scan plane by a second application of the estimated spin rate to obtain orientation of the scanner of the mobile Light Detection and Ranging system;

estimate a scan origin using the estimated scan plane; and perform global smoothing of the estimated scan origin to reconstruct the trajectory of the scanner.

16. The apparatus of claim 15, wherein the processor is configured to partition the scanner data into scanlines using the spin rate.

17. The apparatus of claim 16, wherein to estimate the scan plane, the processor is configured to:
compute normal vector of the scan plane using scan points between the scanlines; and
project each scan point, from among the scan points, to their associated scan planes to obtain a corresponding 2-D coordinate.

18. The apparatus of claim 17, wherein to compute the normal vector, the processor is configured to apply Principal Component Analysis.

19. The apparatus of claim 18, wherein to estimate the scan origin, the processor is configured to determine centroids of each scan point within each scan line to determine an initial scan origin, which is an average of centroids of all the scan points.

20. The apparatus of claim 19, wherein a centroid of the centroids of each scan point corresponds to a trajectory point, and wherein to perform the global smoothing of the estimated scan origin, the processor is configured to apply a weighted moving average process to a position and an orientation or state of each trajectory point.

* * * * *